United States Patent [19]

Cruise

[11] Patent Number: 5,758,896
[45] Date of Patent: Jun. 2, 1998

[54] RUBBER TORSION FRONT SUSPENSION SPRING FOR LIGHTWEIGHT MOTOR VEHICLE

[75] Inventor: Phillip D. Cruise, Royal Oak, Mich.

[73] Assignee: Chrysler Corporation, Auburn Hills, Mich.

[21] Appl. No.: 549,244

[22] Filed: Oct. 27, 1995

[51] Int. Cl.$^6$ ................................................ B60G 3/00
[52] U.S. Cl. .................... 280/695; 267/279; 280/690; 280/691; 280/717; 280/721; 296/901
[58] Field of Search ................. 280/695, 717, 280/716, 721, 700, 690, 691; 267/279; 296/901

[56] References Cited

U.S. PATENT DOCUMENTS

| | | | |
|---|---|---|---|
| 2,148,029 | 2/1939 | Matthews | 267/57 |
| 2,226,406 | 12/1940 | Krotz | 267/21 |
| 2,260,634 | 10/1941 | Mullner | 267/34 |
| 2,286,609 | 6/1942 | Ledwinka | 267/21 |
| 2,409,500 | 10/1946 | Krotz | 267/21 |
| 2,450,506 | 10/1948 | Flogaus | 267/21 |
| 2,804,732 | 9/1957 | Brockley | 51/205 |
| 3,006,627 | 10/1961 | Paulsen | 267/57.1 |
| 3,331,627 | 7/1967 | Schroder et al. | 296/31 |
| 3,371,940 | 3/1968 | Sinclair et al. | 280/43.23 |
| 3,402,940 | 9/1968 | De Coye De Castelet | 280/124 |
| 3,436,069 | 4/1969 | Henschen | 267/57.1 |
| 3,545,737 | 12/1970 | Lamprey | 267/279 |
| 3,779,576 | 12/1973 | Malcolm | 280/717 |
| 4,043,417 | 8/1977 | Orpana | 280/717 |
| 4,473,238 | 9/1984 | Antoine | 280/723 |
| 4,580,808 | 4/1986 | Smith-Williams | 280/700 |
| 4,625,995 | 12/1986 | Aubry et al. | 280/723 |
| 4,695,073 | 9/1987 | Pettibone et al. | 280/690 |
| 4,707,020 | 11/1987 | Enokida et al. | 296/901 |
| 4,830,396 | 5/1989 | Gandiglio | 280/701 |
| 5,009,463 | 4/1991 | Saitoh et al. | 296/210 |
| 5,080,389 | 1/1992 | Kawano et al. | 280/667 |
| 5,411,285 | 5/1995 | Lee | 280/701 |

FOREIGN PATENT DOCUMENTS

| | | |
|---|---|---|
| 628328 | 8/1949 | United Kingdom. |
| 628330 | 8/1949 | United Kingdom ........... 280/717 |
| 1237615 | 6/1971 | United Kingdom. |
| 2207975 | 2/1989 | United Kingdom. |

OTHER PUBLICATIONS

B.F. Goodrich Rubber Mountings, Article From A Book Entitled: "Automotive Engineering" Author Heldt, Published in the 50's, Reference pp. 21–65.

*Primary Examiner*—Eric D. Culbreth
*Attorney, Agent, or Firm*—Kenneth H. MacLean

[57] ABSTRACT

An automobile includes a plastic body and a steel frame bonded to the plastic body. The front suspension system of the automobile includes a "v"-shaped control arm coupled to a front wheel. An arm shaft extends between the "v" of the control arm and is engaged with a rubber cartridge press-fit into a cartridge housing that is affixed to the frame. Thereby, motion of the control arm is attenuated. Alternatively, the arm shaft extends rearwardly away from the control arm. A horizontally-mounted transversely-oriented shock absorber further interconnects the control arm and frame. This shock absorber orientation avoids transferring suspension system loads to the plastic body.

12 Claims, 1 Drawing Sheet

RUBBER TORSION FRONT SUSPENSION SPRING FOR LIGHTWEIGHT MOTOR VEHICLE

CROSS-REFERENCE TO RELATED APPLICATIONS

This application is related to co-pending U.S. patent application Ser. Nos. 08/540,297, 08/540,373, 08/539,257 and 08/922,121, incorporated herein by reference.

FIELD OF INVENTION

The present invention relates generally to vehicle suspension systems, and more particularly to suspension systems for lightweight motor vehicles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that a useful, low-cost, lightweight automobile can be provided which has a molded plastic body consisting essentially of a unitarily molded left half side bonded to a unitarily molded right half side. It will readily be appreciated that a molded plastic body is both lightweight, compared to metal automobile bodies, and inexpensive, compared to, e.g., fiberglass automobile bodies.

As further recognized by the present invention, by making an automobile body of lightweight molded plastic, weight bearing components such as suspension springs can be simplified vis-a-vis weight bearing components of heavier steel-body automobiles. Consequently, the overall cost of the lightweight automobile can be even further reduced relative to heavier automobiles.

It happens, however, that as recognized herein, in making an automobile body of plastic, additional changes beyond simplification must be made to the automobile suspension system relative to existing suspension systems. For instance, in existing automobile suspension systems, elongated shock absorbers are mounted vertically between the suspension springs and the body of the automobile, with the body thus providing load support for the shock absorbers. The present invention recognizes that plastic automobile bodies unfortunately cannot easily provide sufficient load support for shock absorbers.

Indeed, as recognized herein the load of the shock absorbers on the plastic body, were the shock absorbers to be connected directly to the body, could crack and otherwise damage the body. Simply reinforcing the plastic body to support the shock absorber load would tend to undesirably increase the cost of the automobile and would not necessarily be effective in preventing body damage over prolonged automobile use. Accordingly, it is one intent of the present invention to support suspension system shock absorbers with structure other than the automobile body.

It is therefore an object of the present invention to provide a suspension system for a lightweight automobile that incorporates a relatively simple design. Another object of the present invention is to provide a suspension system for a lightweight automobile that is effective in stabilizing the automobile. Still another object of the present invention is to provide a suspension system for a lightweight automobile in which shock absorbers are not connected directly to the body of the automobile. Yet another object of the present invention is to provide a suspension system for a lightweight automobile that is easy to use and cost-effective to manufacture.

SUMMARY OF THE INVENTION

A suspension system for a motor vehicle having a frame and a front wheel includes a rigid hollow cartridge housing connected to the frame. A resilient, preferably rubber cartridge is disposed in the cartridge housing, preferably by press-fitting the cartridge into the housing.

Furthermore, a rigid, preferably "v"-shaped control arm couples the resilient cartridge with the front wheel. In accordance with the present invention, the control arm includes front and rear legs, with each leg defining a respective outboard end and a respective inboard end. The outboard end of each leg is coupled to the front wheel, with the inboard end of the front leg being distanced from the inboard end of the rear leg.

An arm shaft is connected to the rear leg of the control arm and is preferably splined to the rear leg, and the arm shaft extends rearwardly away from the rear leg. Per the present invention, the arm shaft is embedded in the resilient cartridge and is engaged with the cartridge, to substantially prevent relative motion therebetween. Preferably, the arm shaft is bonded by vulcanization to the cartridge. Thereby, rotational motion of the arm shaft relative to the cartridge is attenuated.

In another aspect of the present invention, an apparatus includes an automobile that in turn includes a plastic molded body, a first front wheel, and a frame. A first suspension system couples the first front wheel to the frame. Per the present invention, the first suspension system includes a first resilient non-metallic torque absorbing member. Likewise, a second suspension system independent of the first suspension system couples a second front wheel of the automobile to the frame.

In still another aspect of the present invention, a method of coupling a frame of an automobile to a front wheel of the automobile includes connecting a rigid hollow cartridge housing to the frame, and disposing a resilient cartridge in the cartridge housing. The method further includes coupling a rigid "v"-shaped control arm to the front wheel. An arm shaft is connected to a rear leg of the control arm such that the arm shaft is distanced from a front leg of the control arm, and the arm shaft is embedded in the resilient cartridge to substantially impede relative motion therebetween. Thereby, rotational motion of the arm shaft relative to the cartridge is attenuated.

The details of the present invention, both as to its structure and operation, can best be understood in reference to the accompanying drawings, in which like reference numerals refer to like parts, and in which:

3

Figure 3:
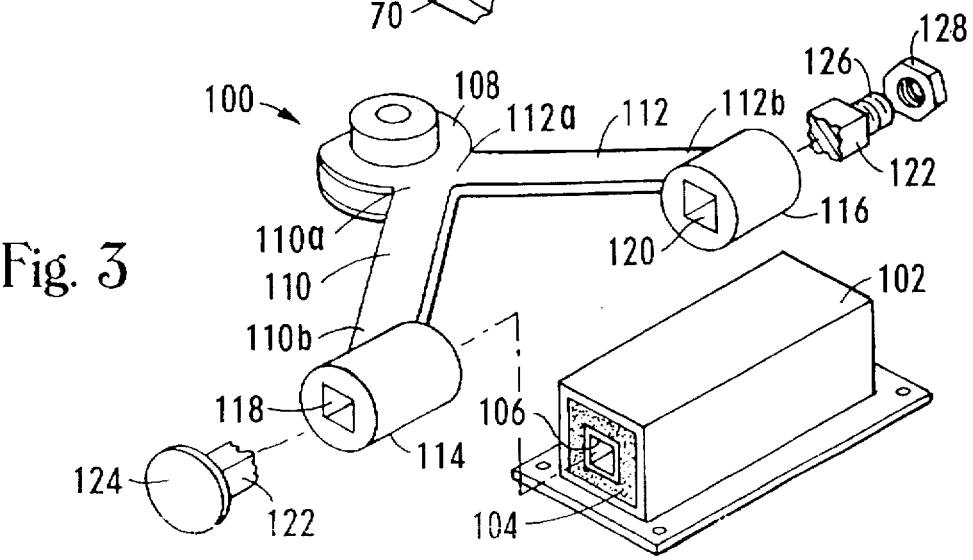

FIG. 3 is an exploded perspective view of an alternate embodiment of the front resilient cartridge spring of the present invention.

DETAILED DESCRIPTION OF THE PREFERRED EMBODIMENT

Figure 1:
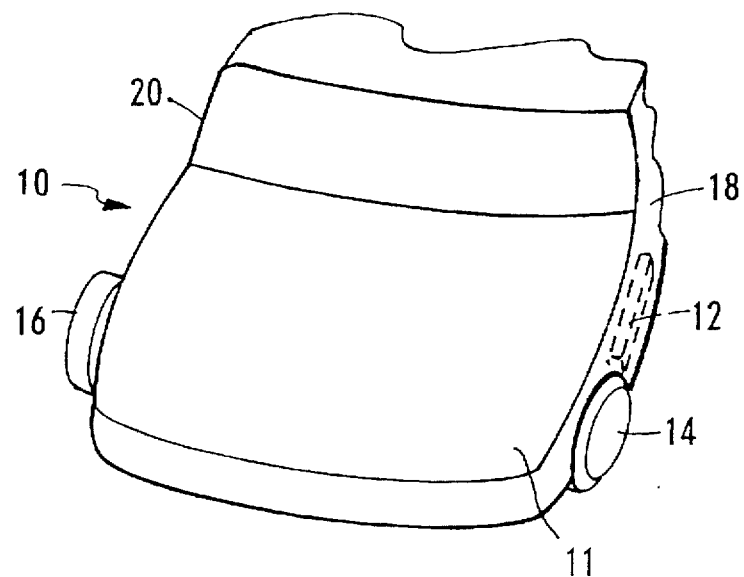
FIG. 1 is a perspective view of an automobile incorporating the novel suspension system of the present invention, with the frame shown in phantom and with portions broken away.

Referring initially to FIG. 1, an automobile 10 is shown which includes a plastic body 11 that is attached to a steel automobile frame 12, shown in phantom in FIG. 1. As shown, the automobile 10 also includes front left and right wheels 14, 16. Preferably, the automobile body 11 is made of a plastic composite material by injection molding. In a particularly preferred embodiment, the automobile body 11 is made of fiberglass-reinforced polyethylene (PET) plastic, such as the material that is available from Hoechst-Celanese under the trade name Celstran PET-15 having 15% fiberglass by weight.

As fully disclosed in the above-referenced U.S. patent application Ser. No. 08/540,297, in the presently preferred embodiment the body 11 is made of four molded pieces. Specifically, the body 11 includes unitarily molded inner left and right panels which are bonded together. Also, the body 11 is made of unitarily molded outer left and right panels which are bonded to their respective inner panels. As intended by the present invention, the inner and outer left panels establish a relatively stiff molded left shell 18, while the inner and outer right panels establish a relatively stiff molded right shell 20. While FIG. 1 shows a four-piece body 11, it is to be understood that the present invention may be incorporated in automobiles having plastic bodies configured differently from the body 11.

Figure 2:
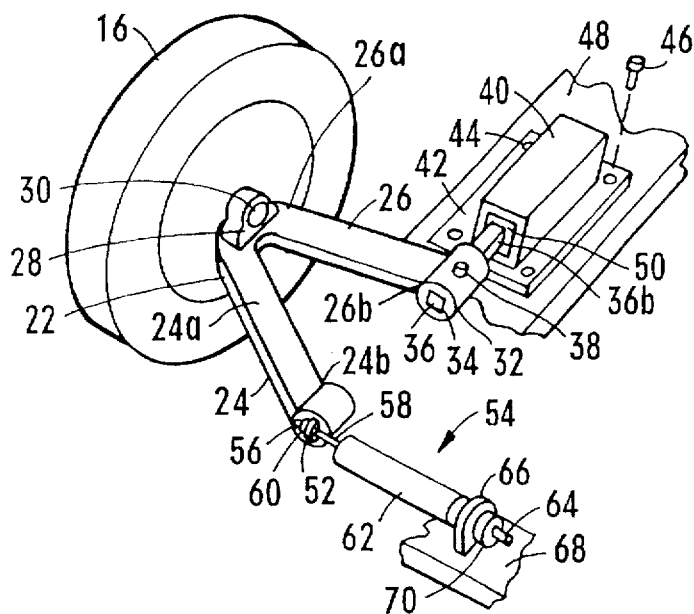
FIG. 2 is a perspective view of the right side components of the front suspension system of the present invention in engagement with the frame, with portions broken away for clarity.

Now referring to FIG. 2, the right front wheel 16 of the automobile 10 is shown in cooperation with the frame 12. It is to be understood that the left front wheel 14 is coupled to the frame 12 in a manner substantially identical with that described below with respect to the right front wheel 16. Thus, the components of the front suspension system described below are associated with the right front wheel 16, with substantially identical components being associated with the left front wheel 14.

As shown in FIG. 2, a "v"-shaped rigid steel control arm 22 is coupled to the wheel 16 and to the frame 12, as more fully disclosed below. As intended by the present invention, the control arm 22 is "v"-shaped in that a portion of the arm 22 is shaped generally as the letter "v". It is to be understood that a control arm (not shown) which in all essential respects is identical to the control arm 22 shown in FIG. 2 couples the left front wheel 14 of the automobile 10 to the frame 12.

In the specific embodiment shown, the control arm 22 is formed with an elongated front leg 24 and an elongated rear leg 26. As used herein, orientation terms such as "front", "rear" "transverse", "longitudinal", "outboard", and "inboard" are referenced to the automobile 10.

Each leg 24, 26 shown in FIG. 2 has a respective outboard end 24a, 26a, and the outboard ends 24a, 26a are formed integrally together as shown. Furthermore, each leg 24, 26 has a respective inboard end 24b, 26b, and the inboard ends 24b, 26b are distanced from each other, consequently establishing the "v" shape of the control arm 22.

As shown in FIG. 2, the outboard ends 24a, 26a of the legs 24, 26 are coupled to the wheel 16 by means well-known in the art. For example, in one presently preferred embodiment, a ball bracket 28 including a ball 30 is formed on the control arm 22 near the outboard ends 24a, 26a, and the ball 30 is coupled to a joint (not shown) that is attached to the wheel 16 in accordance with principles well-known in

4 the art. It is to be understood that the legs 24, 26 of the control arm 22 are configured as appropriate to avoid interference with other components of the automobile 10.

Nevertheless, it is to be understood that the control arm of the present invention, in an elemental embodiment, is a rigid, v-shaped control arm, apart from incidental configurations which may be necessary, depending on the model of the automobile 10, to clear interference with other automotive components. Thus, as intended by the present invention, the control arm 22 is different than current suspension springs, which have material resiliency so they can flex under load. In contrast, the control arm 22 substantially does not flex.

In continued reference to FIG. 2, the inboard end 26b of the rear leg 26 is formed with a hollow cylindrical shaft holder 32. As shown, the shaft holder 32 defines a channel 34 that is parallelepiped-shaped and that is oriented generally parallel to the longitudinal axis of the automobile 10. An elongated rigid steel parallelepiped-shaped arm shaft 36 is complementarily configured with the channel 34 and is closely engaged therewith. In other words, the arm shaft 36 is splined at one end to the rear leg 26, and the arm shaft 36 preferably extends entirely through the channel 34. With this combination of structure, the arm shaft 36 cannot rotate in the channel 34. If desired, a pinch bolt 38 may be threadably engaged with the control arm 22 and rotated to urge tightly against the arm shaft 36, to further rigidly engage the arm shaft 36 with the control arm 22.

Per the embodiment shown in FIG. 2, a single a generally parallelepiped-shaped hollow steel cartridge housing 40 is fixedly attached to the frame 12. More particularly, a flat bottom skirt 42 of the cartridge housing 40 is formed with a plurality of holes 44, and a plurality of threaded fasteners 46 (only a single fastener 46 shown for clarity of disclosure) extend through the holes 44 and are threadably engaged with female receptacles in a longitudinal frame 48 of the frame 12 to hold the cartridge housing 40 onto the frame 12.

An elongated resilient rubber cartridge 50 is press-fit into the cartridge housing 40 in a close fit therewith. Additionally, the cartridge 50 can be bonded to the cartridge housing 40 by vulcanization. In accordance with the present invention, the cartridge 50 establishes a resilient non-metallic torque absorbing member. In one presently preferred embodiment, the cartridge 50 is made of a type ASTM specification M4AA624A13B13F17Z1 natural rubber made by Goodyear Tire Co.

In the embodiment shown, the cartridge 50 is square-shaped in transverse (with respect to the cartridge 50) cross-section. Accordingly, the cartridge housing 40 is formed with a square-shaped channel for closely receiving the cartridge 50 therein. It is to be understood, however, that cartridge shapes other than square may be used. For example, the transverse cross-section of the cartridge 50 can be hexagonally shaped. In a preferred embodiment, the length of the cartridge 50 is about fourteen inches (14"). Also, the width of the cartridge 50 is about three and a half inches (3.5").

To couple the wheel 16 to the cartridge 50, a solid cylindrical cartridge segment 36b of the other end of arm shaft 36 extends rearwardly away from the control arm 22, and the cartridge segment 36b is embedded in and extends centrally through the cartridge 50. Effectively, the cartridge segment 36b pivotably engages the control arm 22 with the cartridge 50. To tightly bond the cartridge segment 36b to the cartridge 50, the cartridge segment 36b is vulcanized to the cartridge 50. In the presently preferred embodiment, the cartridge segment 36b has a diameter of about one and a half inches (1.5").

With the above disclosure in mind, it may now be appreciated that relative rotational motion between the arm shaft 36 and cartridge 50 is substantially impeded. It may be further appreciated that when the wheel 16 moves up-and-down relative to the automobile 10, as typically occurs during driving, this motion is transferred via the control arm 22 to the arm shaft 36. In turn, the cartridge segment 36b of the arm shaft 36 is urged to rotate, but owing to the vulcanized bond between the segment 36b and the resilient cartridge 50, and the material resiliency of the cartridge 50, rotational motion of the arm shaft 36 (and, hence, up-and-down motion of the control arm 22 and wheel 16) is attenuated. Still further, the rubber torsion spring of the present invention desirably dampens the transmission of road noise from the front wheels of the automobile 10 to the passenger compartment of the automobile 10. If desired, lateral movement of the control arm 22 can be limited by one or more mechanical stops (not shown).

Turning now to the front shock absorbing system of the present invention, FIG. 2 best shows that a shock bracket 52 is formed integrally with or welded to the inboard end 24b of the front leg 24. For clarity of disclosure, the bracket 52 is shown associated with the front leg 24, but it is to be understood that alternatively, the bracket 52 can be associated with the inboard end 26b of the rear leg 26.

Like the inboard end 26b of the rear leg 26, the inboard end 24b of the front leg 24 is configured as a hollow cylinder. Apart from the function disclosed below, the inboard end 24b of the front leg 24 may include a rubber bushing for engagement with other components (not shown).

An elongated, transversely-oriented (with respect to the automobile 10) pneumatic automotive shock absorber, generally designated 54, has an outboard mount 56 connected to the shock bracket 52 by means well-known in the art. In the specific embodiment shown, the outboard mount 56 of the shock absorber 54 is established by a rod 58 of the shock absorber 54, and the rod 58 extends through the bracket 52 and is threadably engaged with a nut 60 to hold the bracket 52 and rod 58 together.

Additionally, a cylinder 62 of the shock absorber 54 is reciprocatingly engaged with the rod 58. In accordance with the present invention, the cylinder 62 establishes an inboard mount of the shock absorber 54 which is directly connected to the frame 12 such that the shock absorber 54 is mounted substantially horizontally on the automobile 10. In the embodiment shown, a threaded shaft 64 extends transversely from the cylinder 62 and through a frame bracket 66 that is fixed, as by welding, to a transverse frame beam 68 of the frame 12. The transverse frame beam 68 may be welded to the longitudinal frame beam 48. A nut 70 is engaged with the shaft 64 and is tightened against the frame bracket 66 to directly connect the shock absorber 54 to the frame 12.

Accordingly, as shown the shock absorber 54 of the present invention is not oriented substantially vertically relative the automobile 10, nor is the shock absorber 54 connected directly to the body 11 of the automobile 10, in contrast to conventional shock absorber arrangements. Instead, the shock absorber 54 is oriented substantially transversely and horizontally relative to the automobile 10, and is connected directly to the frame 12 instead of the body 11. Consequently, the force loading of the shock absorber 54 is distributed to the frame 12, and stress to the plastic body 11 induced by the suspension system of the automobile 10 is thereby avoided. Moreover, the disclosed arrangement of the shock absorber 54 absorbs side-to-side sway motion of the automobile 10.

In the embodiment shown, the shock absorber 54 is canted slightly downwardly from its outboard mount to its inboard mount to avoid interference with other components of the automobile 10. It is to be understood that other slight variations in the orientation of the shock absorber 54 may be effected to avoid interference. Nonetheless, the shock absorber 54 of the present invention is mounted substantially transverse relative to the automobile 10, and is connected to the frame 12. In one presently preferred embodiment, the shock absorber 54 is a type X68560 Monroe shock absorber.

FIG. 3 shows an alternate embodiment of the rubber torsion front spring of the present invention, generally designated 100. As shown, the spring 100 includes a rigid hollow parallelepiped-shaped steel cartridge housing 102 that is connected to the frame of an automobile in accordance with principles disclosed above.

A resilient rubber cartridge 104 is press fit in the cartridge housing 102, also in accordance with principles disclosed above. Additionally, a hollow steel arm shaft sleeve 106 is centrally disposed in the cartridge 104 and is bonded to the cartridge 104 by vulcanization. Thus, the cartridge 104 is sandwiched between the cartridge housing 102 and sleeve 106.

The alternate embodiment shown in FIG. 3 also includes a rigid steel v-shaped control arm 108. Like the control arm 22 shown in FIG. 2, the control arm 108 shown in FIG. 3 includes front and rear legs 110, 112. Each leg 110, 112 defines a respective outboard end 110a, 112a, with the outboard end of each leg 110, 112 being coupled to a front wheel of an automobile (not shown in FIG. 3) by means well-known in the art. Each leg 110, 112 shown in FIG. 3 also defines a respective inboard end 110b, 112b. As shown, the inboard end 110b of the front leg 110 is distanced from the inboard end 112b of the rear leg 112.

Unlike the embodiment shown in FIG. 2, each inboard end 110b, 112b of the control arm 108 shown in FIG. 3 is formed with a respective hollow cylindrical shaft holder 114, 116. As shown, each shaft holder 114, 116 defines a respective channel 118, 120 that is parallelepiped-shaped. It can be readily appreciated in reference to FIG. 3 that the cartridge housing 102 is disposed between the shaft holders 114, 116, with the channels 118, 120 of the shaft holders 114, 116 being coaxial with the arm shaft sleeve 106.

An elongated rigid steel parallelepiped-shaped arm shaft 122 is complementarily configured with the channels 118, 120 and the arm shaft sleeve 106 in close engagement therewith. In other words, the arm shaft 122 is splined to the front and rear legs 110, 112, and is engaged with the cartridge 104 via the arm shaft sleeve 106. Thus, the arm shaft 122 mates with the arm shaft sleeve 106, and consequently cannot rotate therein. Preferably, the arm shaft 122 extends entirely through the channels 110, 112.

Accordingly, the arm shaft 122 is engaged with the resilient cartridge 104 intermediate the legs 110, 112 to impede relative motion between the arm shaft 122 and resilient cartridge 104. Thereby, rotational motion of the arm shaft 122 relative to the cartridge 104 is attenuated.

To hold the arm shaft 122 in engagement with the legs 110, 112 and sleeve 106, the arm shaft 122 is formed with an enlarged head 124 which abuts the shaft holder 114 of the front leg 110. Also, the arm shaft 122 is formed with a threaded rear extension 126 which extends rearwardly beyond the shaft holder 116 of the rear leg 112. A nut 128 is threadably engaged with the extension 126 to thereby hold the arm shaft 122 in engagement with the legs 110, 112 and sleeve 106.

While the particular RUBBER TORSION FRONT SUSPENSION SPRING FOR LIGHTWEIGHT MOTOR VEHICLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A suspension system for a motor vehicle having a frame, a plastic body attached to the frame, and a front wheel, comprising:

one and only one rigid hollow cartridge housing connected to the frame adjacent the front wheel;

one and only one resilient cartridge disposed in the cartridge housing;

a rigid control arm including front and rear legs, each leg defining a respective outboard end, the outboard end of each leg being coupled to the front wheel, each leg also defining a respective inboard end, the inboard end of the front leg being distanced from the inboard end of the rear leg; and a shaped arm shaft having one end rigidly connected to the rear leg and extending rearwardly therefrom, the arm shaft having another end splined to the resilient cartridge and engaged therewith to substantially prevent relative motion therebetween to thereby attenuate rotational motion of the arm shaft to the cartridge.

2. The suspension system of claim 1, wherein the control arm is "v"-shaped.

3. The suspension system of claim 2, wherein the resilient cartridge is made of rubber.

4. The suspension system of claim 3, wherein the resilient cartridge is press fit into the cartridge housing.

5. The suspension system of claim 4, wherein the arm shaft is bonded to the resilient cartridge by vulcanization.

6. The suspension system of claim 5, wherein the arm shaft extends through the cartridge.

7. An apparatus, comprising:

an automobile including a plastic molded body, a front wheel, and a frame; and a suspension system coupling the front wheel to the frame, the suspension system including one and only one resilient non-metallic torque absorbing member mounted on the frame adjacent the front wheel;

a cartridge housing, wherein the resilient non-metallic torque absorbing member is a resilient cartridge disposed in the cartridge housing;

a rigid control arm including front and rear legs, each leg defining a respective outboard end, the outboard end of each leg being coupled to the front wheel, each leg also defining a respective inboard end, the inboard end of the front leg being distanced from the inboard end of the rear leg;

an arm shaft connected to the rear leg of the control arm and distanced from the front leg of the control arm, the arm shaft being embedded in the resilient cartridge and engaged therewith to substantially impede relative motion therebetween to thereby attenuate rotational motion of the arm shaft relative to the cartridge.

8. The apparatus of claim 7, wherein the arm shaft is splined to the control arm and bonded to the resilient cartridge by vulcanization.

9. The apparatus of claim 8, wherein the arm shaft extends rearwardly away from the rear leg of the control arm.

10. A method of coupling a frame of an automobile having a plastic body to a front wheel of the automobile, comprising:

connecting one and only one rigid hollow cartridge housing to the framed;

disposing one and only one resilient cartridge in the cartridge housing;

coupling a rigid "v"-shaped control arm to the front wheel;

rigidly connecting an arm shaft to a rear leg of the control arm such that arm shaft is distanced from a front leg of the control arm; and embedding the arm shaft in the resilient cartridge to substantially impede relative motion therebetween to thereby attenuate rotational motion of the arm shaft relative to the cartridge.

11. A suspension system for a motor vehicle having a longitudinal axis, a plastic body attached to a frame and a front wheel connected to the frame, the system comprising:

a housing connected to the frame and separated from the body;

a resilient cartridge disposed in the housing and separated from the body;

a rigid control arm coupled to the front wheel and to the frame; and a longitudinally extending shaft rigidly and non-rotatively connected to the control arm and embedded in the resilient cartridge and engaged therewith to attenuate rotational motion of the control arm relative to the cartridge by torsion of said resilient cartridge and thereby absorb shock between the front wheel and the body without contact between the suspension system and the body.

12. The system of claim 11, further comprising a shaft holder provided on a rear portion of said control arm and forming a splined connection with said shaft.

* * * * *